Figure 6:
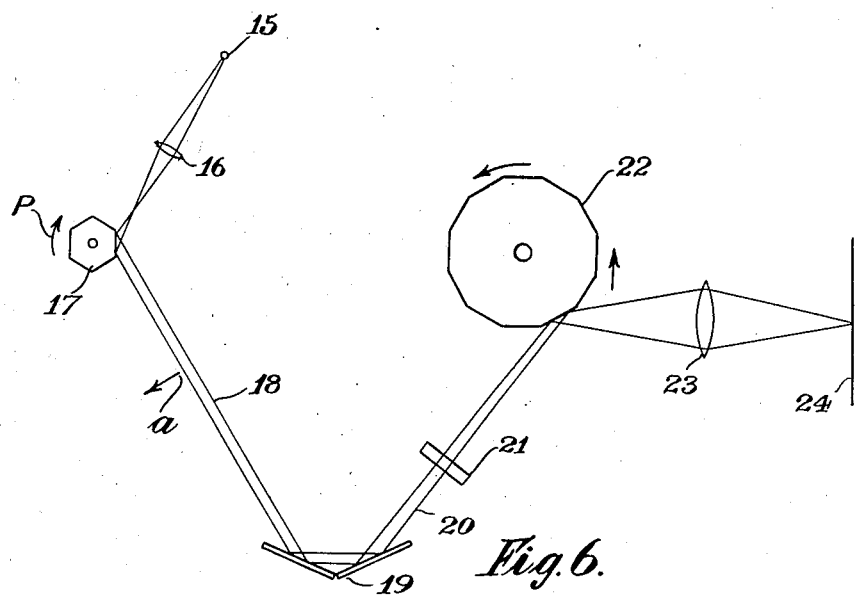

June 6, 1939. J. H. JEFFREE 2,161,299
TELEVISION AND THE LIKE SYSTEM
Filed Jan. 23, 1937 2 Sheets-Sheet 1
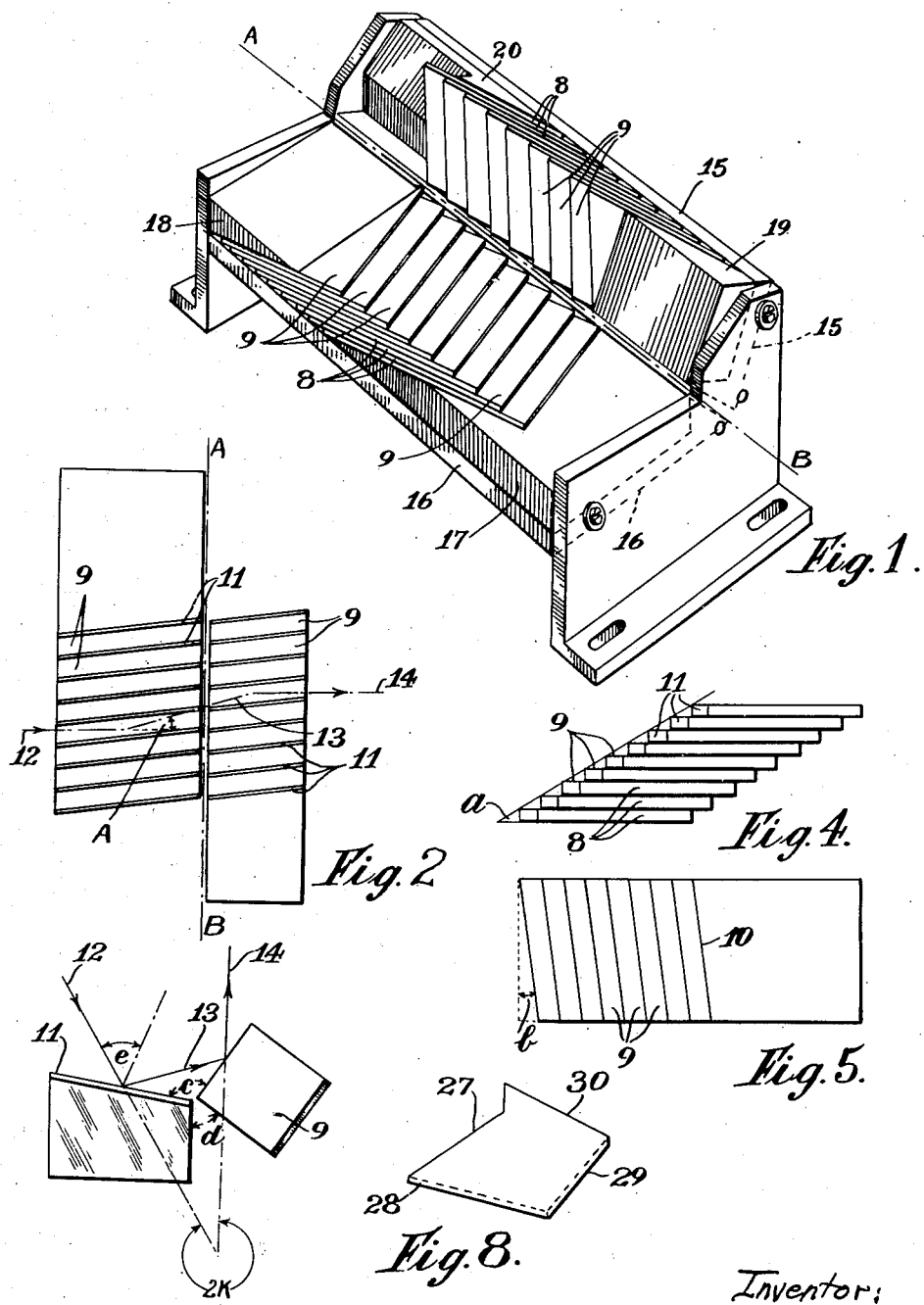
Inventor:
J. H. Jeffree June 6, 1939.  J. H. JEFFREE  2,161,299
TELEVISION AND THE LIKE SYSTEM
Filed Jan. 23, 1937  2 Sheets-Sheet 2

Inventor:
J. H. Jeffree
By: J. Oppenheimer
atty.

Patented June 6, 1939

2,161,299

UNITED STATES PATENT OFFICE 2,161,299

TELEVISION AND THE LIKE SYSTEM

John Henry Jeffree, Oxshott, England, assignor to Scophony Limited, Campden Hill, London, England, a company of Great Britain Application January 23, 1937, Serial No. 122,017
In Great Britain January 25, 1936

7 Claims. (Cl. 178—7.6)

The present invention relates to optical transforming devices, examples of which are described with reference to a television scanning system in my British Patent Specification No. 433,945 and certain features of which are described and claimed in my co-pending United States application Serial No. 3062, filed Jan. 23, 1935.

As fully described in the above mentioned specification one property of such devices is the ability to change a beam of light having different light grasps in two mutually perpendicular directions and having movement in the direction of its smaller light grasp into a similar beam of light having corresponding motion in the direction of its larger grasp. The term light grasp is explained in the above mentioned co-pending application, and is defined as the product of the angle of divergence of the beam multiplied by the width of the exit pupil.

In the specification of my co-pending application No. 122,016, filed Jan. 23, 1937, there is described another property of such devices, which is the ability to change a wedge shaped beam of light falling upon it into a beam of light emerging from it which has a much larger light grasp in one direction than in a mutually perpendicular direction and which is divergent in the direction of the larger light grasp.

One type of optical transforming device shown in the specification of my British Patent Specification No. 433,945 consists essentially of a series of reflecting surfaces, which may be mirrors or the internal reflecting surfaces of totally reflecting prisms, the surfaces being arranged in staggered formation so that each surface forms the "tread" of a staircase.

An object of the present invention is to provide an improved optical transforming device of this type.

It is a further object of the invention to provide an optical transforming device comprising two staircases having reflecting treads, and arranged to be optically co-operative.

It is yet a further object of the present invention to provide an optical transforming device of this kind comprising two staircases each formed of a series of optically reflecting elements, the mean planes of said staircases being inclined to one another and the risers of one staircase facing in a direction opposite to that in which the risers of the other staircase face.

It is another object of the present invention to provide an optical transforming device comprising a series of reflecting surfaces arranged in staggered formation to form a staircase, said reflecting surfaces forming the treads of said staircase, a second series of reflecting surfaces arranged in like manner, said staircase being so arranged that the mean planes of said staircases are inclined at an angle to one another, and that the risers of said staircases face towards opposite ends of said device.

By the term "mean plane" of a staircase is meant that plane which contains those edges of the stairs which are formed by the intersection of the treads and risers of each stair.

One advantage of such a construction is that it permits of an increased optical efficiency, and another advantage is that the device can handle a moving light beam having a much greater angle of movement than hitherto.

In order to transmit the light with minimum loss, the said edges of the stairs are preferably set at an oblique angle to the junction line AB of the staircases as shown in Figs. 1 to 5. The edges may however be at right angles thereto.

The invention will now be described with reference to the accompanying diagrammatic drawings in which Fig. 1 shows a perspective view of one form of device according to the present invention, Figs. 2 and 3 show in plan view and end elevation respectively the device shown in Fig. 1, the supporting framework being however omitted for the sake of clearness, Figs. 4 and 5 show in side elevation and plan respectively one staircase of the device of Figs. 1 to 3, Figs. 6 and 7 show a side elevation and plan view of a television receiver incorporating the device of Figs. 1 to 5, and Fig. 8 shows an end elevation of an alternative form of device according to the invention.

Referring to Figs. 1 to 5, each staircase is constructed from a number of flat laminae 8 having mirror surfaces 9, which are piled one on top of the other. The two staircases are secured in a manner to be described hereinafter, in the relative positions shown in Fig. 1. The mean planes of the staircases form an angle with each other, and an edge of one mean plane is substantially coincident with an edge of the other to form a junction line AB, Figs. 1 and 2. By the edge of a mean plane is meant the line formed by the intersection of the mean plane and one side of the staircase. The arrangement can be compared to a partially opened book, in which the lines of printing on the pages slope upward from left to right. The mean planes of the staircases face one another at an angle in a manner corresponding to the surfaces of two opposite pages, and the direction of the edges of the stairs then corresponds approximately to the direction of the sloping lines of the printing on the pages. This is achieved by cutting one edge of the mirror laminations (i. e. that edge of the lamination which goes to form the edge of the tread of the staircase) obliquely with respect to the other edges, which are at right angles to one another, as shown at 10 in Fig. 5.

The form of each completed staircase may be imagined by considering it as cut from a normal staircase of large width, the cuts being made in two parallel planes which are at an angle to the main direction of the staircase.

The two staircases used to form the assembly shown in Fig. 1 need not have the same dimensions, though their dimensions should preferably be at least nearly the same. The two staircases are preferably so placed that the risers 11 of each staircase face those of the other staircase.

When in use, a beam of light is directed on to the reflecting surfaces of one staircase at an angle to the direction of normal incidence, the general direction of the incident beam being at right angles to the junction line A—B of the staircases. This is shown in Figs. 2 and 3, which represent a plan view and end elevation respectively of Fig. 1. The path of the incident light is shown by the line 12. The light is then reflected along the path 13 obliquely across between the two staircases (see Fig. 2) on to the reflecting surfaces 9 of the second staircase, and is then reflected to form the emergent beam 14, the direction of which is also at right angles to the junction line A B of the staircases, but is inclined at an angle to the direction of the incident beam.

The mirror laminations are preferably secured in position in the manner shown in Fig. 1 by means of a framework which includes two long troughs of rectangular cross-section. The two ends of each trough are not perpendicular to the bottom but are inclined at an angle equal to the desired angle of slope of each staircase. The mirror laminations are packed into the troughs and lie in an inclined position parallel to the ends of the troughs. As shown in Fig. 1 this is effected by placing in the troughs 15 and 16 end portions 19, 20 and 17, 18 respectively, which serve to give the laminae 8 the necessary inclination. They are held in position by friction between their adjacent surfaces, or by any other suitable means. The troughs are inclined to one another so that the mean planes of the two staircases are also inclined to one another at the desired angle.

If the device is to possess the property of transforming an incident beam having motion in the direction of one light grasp into an emergent beam having its motion in a direction at right angles to the corresponding light grasp, it is preferred that certain relations between the geometry of the device, and the directions of the incident and emergent beams should be observed. The relations are expressed by the following formulae:

$$B = K - E \quad (1)$$

$$\cos A = \frac{\sin E}{\sin B} \quad (2)$$

$$\sin 2a = \frac{\sin A}{\cos B} \quad (3)$$

$$\sin H = \sin B \cos 2a \quad (4)$$

$$\sin D = \frac{\sin 2a}{\cos H} \quad (5)$$

$$\frac{\sin (D-A)}{\tan H} = 1 \quad (6)$$

$$d - 180 = 2B \quad (7)$$

$$\tan b = \frac{\sin a}{\tan E} \quad (8)$$

$$\sin F = \cos a \sin b \quad (9)$$

$$\sin G = \frac{\cos b}{\cos F} \quad (10)$$

$$c = 2G + 2B - 180 \quad (11)$$

$$e = K - \frac{c}{2} \quad (12)$$

In these formulae, 2K is the angle between the incident and emergent beams, i. e. it measures the change of direction of the beam after passing through the device (Fig. 3), A is the angle of obliquity of the path of the light between the mean planes of the staircases (Fig. 2), $a$ is the upward slope of the staircases (Fig. 4), $b$ is the angle of obliquity of the edges of the stairs (Fig. 5), $c$ is the angle between the mean planes of the staircases (Fig. 3), $d$ is the angle between the sides of the staircases (Fig. 3), $e$ is the angle of incidence (from normal) of the light on the mean plane of a staircase (Fig. 3), whilst B, H, D, E, F and G are angles occurring in the computation but are not needed for the final result.

One method of solving these equations is as follows:

Arbitrary values are given to angles B and E in the first six equations until equation 6 is satisfied. This gives a series of values for angles A, B, D, H, K, E and $a$. These values are then substituted in Equations 7–12 and the values of the remaining angles thus obtained. Typical values for the various angles are set forth in the following table:

| K | A | $a$ | $b$ | $c$ | $d$ | $e$ | E | B |
|---|---|---|---|---|---|---|---|---|
| 75 | 57.1 | 33.9 | 50.6 | 32.8 | 79.2 | 58.6 | 24.6 | 50.4 |
| 90 | 45.4 | 30 | 35.3 | 69.4 | 70 | 55.3 | 35.25 | 54.75 |
| 105 | 35.3 | 27.5 | 24.8 | 96 | 60 | 57 | 45 | 60 |
| 107 | 34 | 27 | 15.5 | 121.8 | 46.2 | 62.6 | 56.6 | 66.9 |
| 120 | 27.4 | 25.4 | 17.2 | 116 | 98.2 | 62 | 54.1 | 65.9 |
| 123.5 | 25 | 25 | 15.5 | 121.8 | 96.2 | 62.6 | 56.8 | 66.9 |
| 135 | 20.5 | 24.4 | 11.9 | 134 | 36 | 68 | 63 | 72 |

It is clear that there are many other possible forms of construction other than the one described above. For example, totally reflecting prisms can be employed instead of mirrors, the internal reflecting faces of the prisms being arranged to form the staircases. The form of such a device may easily be seen by considering it as a moulding from the device shown in Fig. 1, the third surface of the prism being constituted by the plane in which the outer edges of the staircases lie. The light enters and emerges from this face, being doubly internally reflected in the prism. A device of this kind is illustrated in Fig. 8 of the accompanying drawings, which is an end view of the device, corresponding to Fig. 3. In this figure, the incident light enters through the surface 27, and falls on the stepped surface 29; it is reflected from this surface by total internal reflection on to the stepped surface 28, and from this surface is reflected by total internal reflection through the surface 30 to form the emergent beam. The surfaces 27 and 30 may, if desired, be co-planar. This form of construction results in a device which can be moulded as a whole in a suitable transparent material such as glass, or a transparent synthetic resin.

The application of the present invention to television apparatus will now be described. As described in my copending application No. 3,062, a transforming device is used in television apparatus in which a flat beam of light is given a scanning motion with the aid of suitable scanning devices. If however a flat beam of light is used, it is difficult to give it a scanning movement in the direction of its larger light grasp, since the scanning device must be very large. This is particularly disadvantageous in the case of the line or high-speed scanning motion. On the other hand a scanning device to give a flat beam of light a motion of scanning in the direction of its smaller light grasp may be made very rigid, since the elements may be made narrow. One form of scanning device using a number of metal rods mounted on a drum is described in my copending application No. 3,062 referred to above.

The transforming device is used to change the motion of the beam relative to the beam itself, so that the beam issuing from the device is changed from one having a scanning motion in the direction of its smaller light grasp into one having motion in the direction of its larger light grasp. To achieve this effect the transforming device is made of a number of elements. Each element of the device deals with only a small portion of the whole beam by turning this portion through an angle, usually 90°. Each portion retains its original direction of motion relative to the portion itself. The portions recombine to form the issuing beam. Thus in passing through the device each portion has been turned through 90°, though the beam as a whole has not changed its normal direction of propagation or, to any substantial extent, its shape. The beam as a whole has a direction of motion corresponding to that of each constituent portion, which is at 90° to the original direction, relative to the beam itself. Therefore the beam, after passing through the transforming device, has changed from one having motion in the direction of its smaller light grasp to one having motion in the direction of its larger light grasp. A second scanning device of rigid structure can now be used to give to the beam its second component of a complete scanning motion, in the direction of its smaller light grasp.

In using the device described with reference to Figs. 1 to 5 with a flat beam, the beam preferably falls on the device in such a direction that it intersects the plane of Fig. 2 in a line parallel to the line AB, i. e. the junction line of the two staircases. In Fig. 3, the mean plane of the beam then lies normal to the plane of the figure. The direction of motion of the beam is thus normal to the plane of Fig. 2 and in the plane of Fig. 3.

Figure 7:
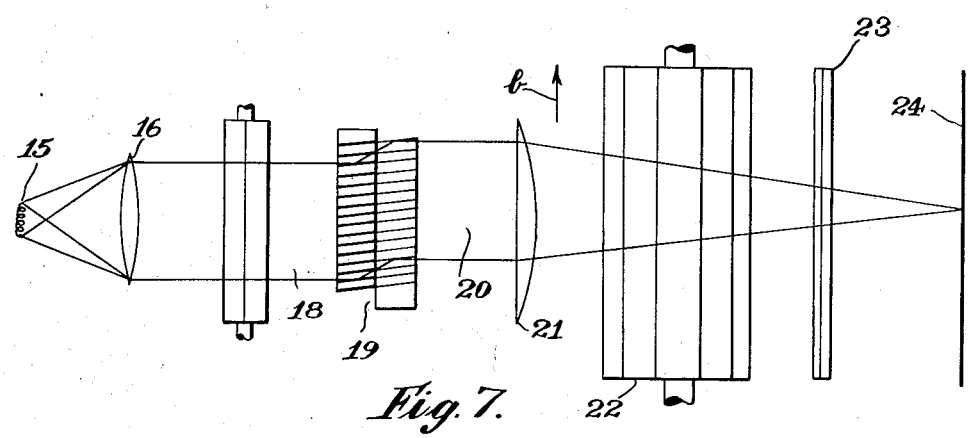

Referring now to Figs. 6 and 7, television transmitting apparatus using the device described above is shown. Light from a light source 15, shown as an incandescent filament the length of which lies in the plane of Fig. 7, passes through the lens 16, which forms an image of the filament on the scanning device 17, which is rotating in the direction of the arrow $p$. This gives the issuing beam 18 a motion in the direction of the arrow $a$ (Fig. 6). The beam 18 may be slightly diverging in the plane of Fig. 6. The beam 18, having thus a motion in the direction of its smaller light grasp falls on the transforming device 19. Owing to the action of the transforming device 19, the issuing beam 20 has motion in the direction of its larger light grasp, that is in the direction of the arrow $b$ (Fig. 7). The beam passes through the cylindrical lens 21 on to the low-speed scanning device 22, and thence through the cylindrical lens 23 on to the screen 24. The cylindrical lens 21 has no power in the plane of Fig. 6, and serves to focus the beam in the plane of Fig. 7 on the screen 24. The cylindrical lens 23 which has no power in the plane of Fig. 7 performs a similar function in the plane of Fig. 6.

The device according to the present invention is not only applicable to television apparatus, but, as already mentioned in the introduction to this specification, the device may be used wherever it may be desired to produce a beam of light having a small light grasp in one direction and a large light grasp in a second direction at right angles to the first direction.

I claim:

1. An optical transforming device comprising a series of reflecting surfaces arranged in staggered formation to form a staircase, said reflecting surfaces forming the treads of said staircase, a second series of reflecting surfaces arranged in like manner, said staircases being so arranged that the mean planes of said staircases are inclined at an angle to one another, that the risers of said staircases face towards opposite ends of said device, and one of said staircases being positioned to receive light from the other of said staircases.

2. An optical transforming device comprising two sets of reflecting laminations, each set being arranged in the form of a staircase, the reflecting surfaces of said laminations forming the treads of said staircases, said staircases being so arranged that the mean planes of said staircases are inclined at an angle to one another, that the risers of said staircases face towards opposite ends of said device, and one of said staircases being positioned to receive light from the other of said staircases.

3. An optical transforming device comprising two staircases having the treads capable of reflecting light, said staircases being so arranged that the mean planes of said staircases are at an angle to one another, that the risers of said staircases face towards opposite ends of said device, and one of said staircases being positioned to receive light from the other of said staircases.

4. An optical transforming device comprising two staircases having the treads capable of reflecting light, said staircases being so arranged that the mean planes of said staircases are at an angle to one another, that the upward direction of one of said staircases is opposed, in the direction of the junction line of said mean planes, to the upward direction of the other of said staircases, and one of said staircases being positioned to receive light from the other of said staircases.

5. An optical transforming device comprising a prism having two internally reflecting surfaces each in the form of a staircase, the treads of one of said staircases forming one of the internally reflecting surfaces of said prism, and the treads of the other of said staircases forming the other of said internally reflecting surfaces, said staircases being so arranged that the mean planes of said staircases are at an angle to one another, that the risers of said staircases face towards opposite ends of said device, and one of said staircases being positioned to receive light from the other of said staircases.

6. An optical transforming device according to claim 3, wherein the edges of the treads of one of said staircases are at right angles to the junction line of the mean planes of said staircases.

7. An optical transforming device according to claim 3, wherein the edges of the treads of both said staircases make equal angles with the junction line of the mean planes of said staircases.

JOHN HENRY JEFFREE.